No. 752,152. PATENTED FEB. 16, 1904.
C. A. GREEN & H. E. LARSSON.
SWEEPING MACHINE.
APPLICATION FILED JULY 31, 1902.
NO MODEL. 2 SHEETS—SHEET 1.
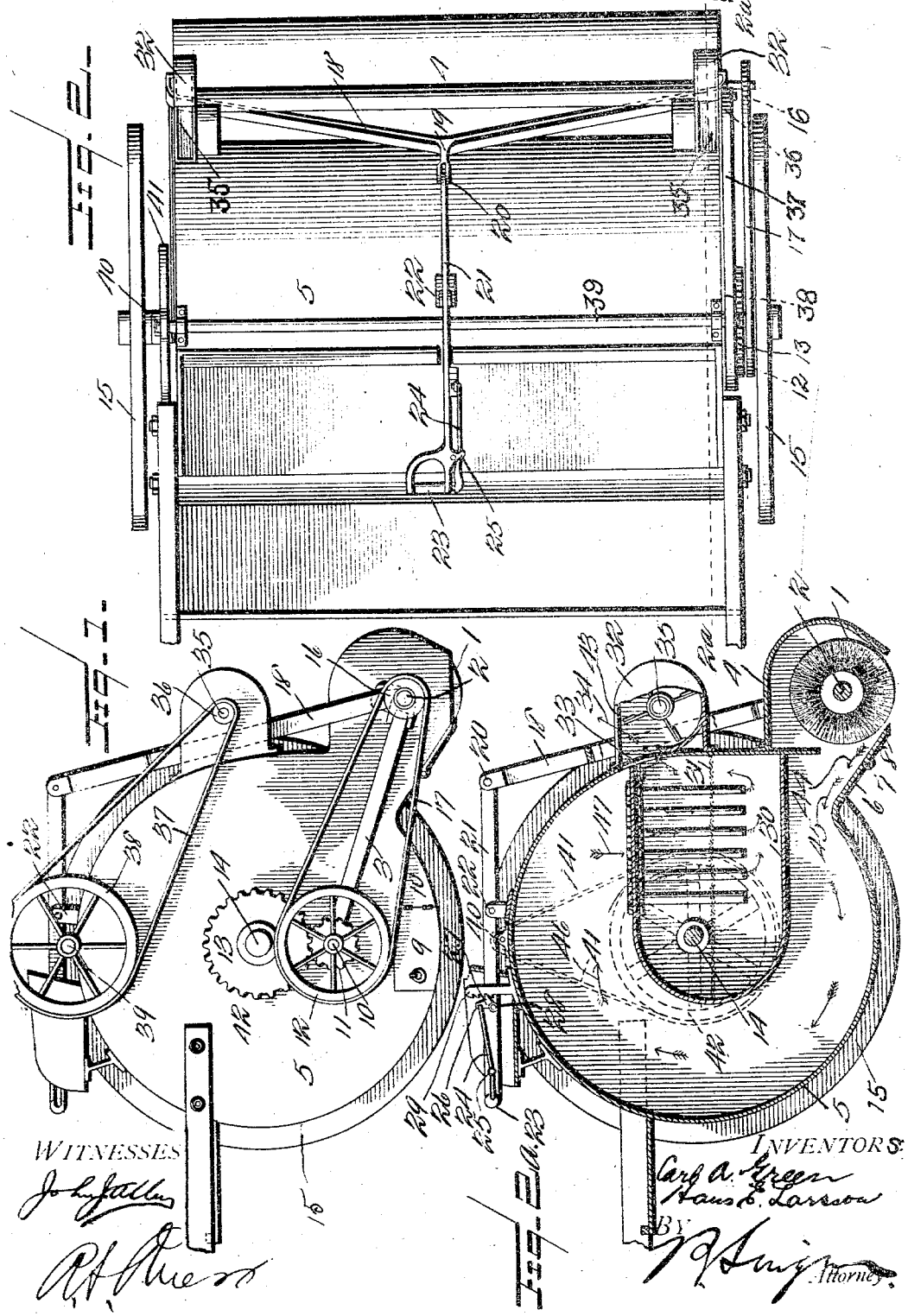

No. 752,152. PATENTED FEB. 16, 1904.
C. A. GREEN & H. E. LARSSON.
SWEEPING MACHINE.
APPLICATION FILED JULY 31, 1902.
NO MODEL. 2 SHEETS—SHEET 2.
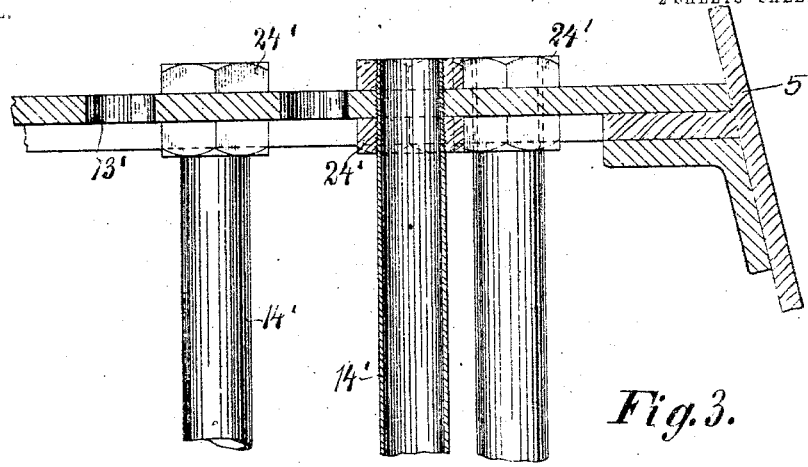
Fig. 3.
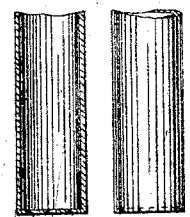
Fig. 4.
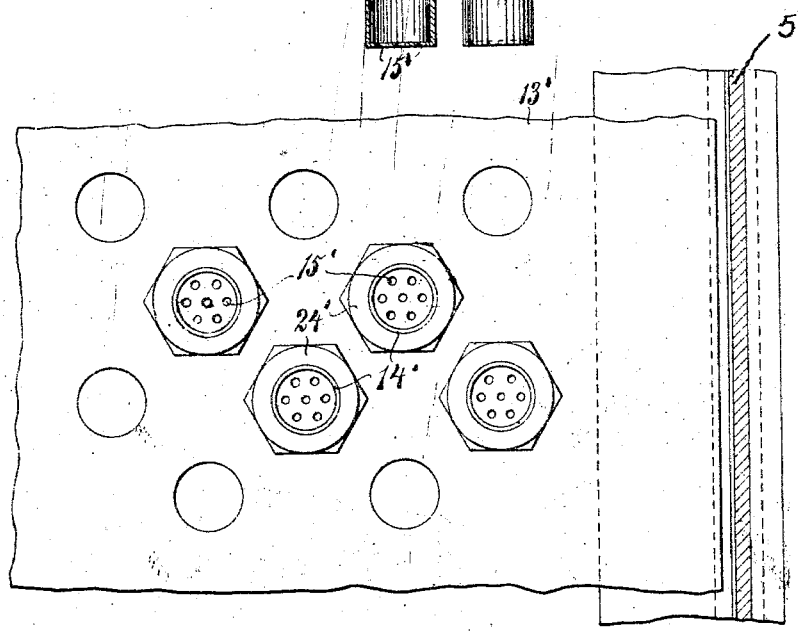
Witnesses.
H. Mori.
L. Waltman.
Inventors.
Carl August Green
Hans Eduard Larsson
by B. Singer Att'y.

No. 752,152. Patented February 16, 1904.

UNITED STATES PATENT OFFICE.

CARL AUGUST GREEN, OF KATRINEHOLM, AND HANS EDUARD LARSSON, OF STOCKHOLM, SWEDEN.

SWEEPING-MACHINE.

SPECIFICATION forming part of Letters Patent No. 752,152, dated February 16, 1904.

Application filed July 31, 1902. Serial No. 117,793. (No model.)

*To all whom it may concern:*

Be it known that we, CARL AUGUST GREEN, residing at Katrineholm, and HANS EDUARD LARSSON, residing at Stockholm, Sweden, citizens of the Kingdom of Sweden, have invented certain new and useful Improvements in Sweeping-Machines; and we declare that the following is a full, clear, and exact description of the invention, which will enable others skilled in the art to which it appertains to make and use the same.

Our invention relates to a sweeping-machine which contemplates, broadly, the confinement of the dust and lighter particles within a receptacle provided with water, the dust and lighter particles being submerged in the water, and thereby being prevented from egressing from the machine after having once entered the same.

The invention is illustrated in the accompanying drawings, wherein—

Figure 1 is a side elevation with one traction-wheel removed. Fig. 2 is a top plan; Fig. 2ª, a vertical sectional view through the line 2ª 2ª of Fig. 1. Fig. 3 is a detail view of the tubes of the water-tank, showing the manner of connecting the same; and Fig. 4 is a top plan view of Fig. 3.

1 designates the brush, mounted upon the shaft 2, this shaft being supported by arms 3, by virtue of which and a mechanism hereinafter described it is possible to adjust the vertical height of the said brush with respect to the surface to be swept. This brush is inclosed within a casing 4, which is of substantially arc form and secured to the main casing 5, which casing is of substantially cylindrical form and is provided with a downwardly-inclined portion 6, to which is hinged, as at 7, the pan 8, this pan having movement in order that any obstructions which may be encountered will not hamper the passage of the pan, the latter by virtue of its hinge having movement imparted thereto by such obstruction which would enable the pan to readily pass the same. The casing 5 is provided with a door 9, hinged, as at 10, in order to enable access to be had to the interior of the casing for the purpose of removing the heavier materials which have been swept by the brush into the casing 5. The opposite ends of the arms 3 are pivotally mounted upon a shaft 10, the latter being journaled in the casing 5 and carrying a pinion 11 and a pulley 12, affixed thereto, the pinion meshing with gear-wheel 13, supported upon the main shaft 14 and by virtue of which movement is imparted to the said pinion, this shaft 14 being affixed to the traction-wheels 15. The shaft 2 is provided with a pulley 16, over which and the pulley 12 of the shaft 10 passes a belt 17, whose function is to revolve the brush 1, as will be manifest. A convenient method of providing means to enable the vertical adjustment of the brush is by employing arms 18, which are secured to the shaft 2 and which incline upwardly and merge into an arm 19, bifurcated, as at 20, to receive one end of the lever 21, fulcrumed, as at 22, by a supporting-post carried on the casing 5, this lever extending rearwardly within reach of the operator and being provided with a handle 23, which supports a pivotally-mounted lever 24, fulcrumed, as at 25, and pivotally connected at its outer end, as at 26, to a pawl 27, which in turn is pivotally secured to the lever 21, the pawl being adapted for engagement with a toothed rack 29, whose base is supported on top of the casing 5. It will be manifest that by raising the rear end of the lever 24 the pawl will be disengaged from the rack 29, and the lever 21 may be rocked on its fulcrum 22 to effect the necessary vertical adjustment of the brush 1 by virtue of the connecting arms 18.

Within the casing 5 is a tank 30, whose top is provided with a series of perforations 13', through which pass the tubes 14', the latter being closed at their lower ends and being foraminous, as indicated at 15, the upper ends of the tubes being open, said tubes being secured to the top of the tank 30 by virtue of nuts 24' 24', which engage about the tubes and embrace the opposing faces of the said tank-top. These tubes extend into the tank to a point a considerable distance from the bottom thereof, it being preferable that there be a piece of reticulated material, such as indicated at 31, extending across the casing horizontally in a plane approximately central thereof. At the ends of the casing 5 are secured fan-casings 32, which are secured to the sides thereof and which communicate with the tank 30 by virtue of openings 33, the fan being driven in the direction indicated by the arrows 34 for the purpose of exhausting air from the tank 30. A convenient method of driving these fans is by mounting on the shafts 35 thereof pulley 36, which is driven by a belt 37, passing over pulley 38, carried on shaft 39, this shaft in turn being provided with pulley 40, which is driven by virtue of belt 41 passing over pulley 42, secured to the shaft 14. The fan-casings 32 are further provided with openings 43, which communicate with the atmosphere.

Upon the brush 1 being revolved in the direction of the arrow 44 the sweepings will be conveyed into the casing in the direction indicated by arrows 45, the heavier particles being deposited in the bottom of the casing 5 and the lighter particles moving upwardly in the direction indicated by arrow 46 to a point indicated by arrow 47. In the meantime the fan is continually exhausting air from the tank 30, thereby creating a difference of atmospheric pressure on the interior of the tank 30 with respect to the casing 5, and owing to this difference in pressure the air manifestly on the interior of tank 30 being of less pressure than that of tank 5 the pressure of the air in the latter will cause the lighter particles to be passed through the tubes 14' and through the end thereof and through the water within tank 30, into which they will be submerged.

The invention as illustrated is susceptible to such changes as fall within the scope of the appended claim.

Having fully described our invention, what we claim as new, and desire to secure by Letters Patent, is—

A device of the type set forth comprising a casing having a water-tank therein, means on the casing communicating with the tank for exhausting air from the latter, a series of tubes having their upper ends open and extending through the top of said tank and secured thereto, said tubes having closed foraminous lower ends, in combination with a brush and means for simultaneously operating the brush with said exhausting means, said tank being located intermediate the top and bottom of the casing and secured to the forward end thereof, whereby an arc-shaped passage is formed leading from the brush to the upper ends of said tubes.

In testimony whereof we affix our signatures in presence of two witnesses.

CARL AUGUST GREEN.
  HANS EDUARD LARSSON.

Witnesses:
  Ems. S. Nawhindle,
  Thor Fredborg.